United States Patent
Maab et al.

(10) Patent No.: US 11,814,473 B2
(45) Date of Patent: *Nov. 14, 2023

(54) POLYTRIAZOLE COPOLYMER COMPOSITIONS

(71) Applicant: Saudi Arabian Oil Company, Dhahran (SA)

(72) Inventors: Husnul Maab, Dhahran (SA); Nayef M. Alanazi, Dhahran (SA); Turki A. Al-Khaldi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 301 days.

This patent is subject to a terminal disclaimer.

(21) Appl. No.: 17/140,685

(22) Filed: Jan. 4, 2021

(65) Prior Publication Data

US 2022/0017688 A1 Jan. 20, 2022

Related U.S. Application Data

(63) Continuation of application No. 16/931,565, filed on Jul. 17, 2020, now abandoned.

(51) Int. Cl.
*C08G 61/12* (2006.01)

(52) U.S. Cl.
CPC ....... *C08G 61/123* (2013.01); *C08G 2261/12* (2013.01); *C08G 2261/148* (2013.01);
(Continued)

(58) Field of Classification Search
CPC .. C08G 65/4037; C08G 61/123; C08G 75/23; C08G 2261/12; C08G 2261/148;
(Continued)

(56) References Cited

U.S. PATENT DOCUMENTS

| 3,773,544 A | 11/1973 | Newton et al. |
| 4,119,593 A | 10/1978 | Smith et al. |

(Continued)

FOREIGN PATENT DOCUMENTS

| AT | 441688 T | 9/2009 |
| AT | 527303 T | 10/2011 |

(Continued)

OTHER PUBLICATIONS

Chisca et al., "Crosslinked copolyazoles with a zwitterionic structure for organic solvent resistant membranes", Polym. Chem., vol. 6, pp. 543-554, 2015.

(Continued)

*Primary Examiner* — Shane Fang
(74) *Attorney, Agent, or Firm* — DINSMORE & SHOHL LLP

(57) ABSTRACT

A polytriazole copolymer may include substituted phenyls, substituted benzyls, or both substituted phenyls and substituted benzyls. The substituted phenyls and the substituted benzyls may be independently substituted with hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy groups. The polytriazole copolymer may have a degree of polymerization from 25 to 250.

19 Claims, 1 Drawing Sheet

(52) U.S. Cl.
CPC .............. *C08G 2261/3221* (2013.01); *C08G 2261/334* (2013.01)

(58) Field of Classification Search
CPC ...... C08G 2261/3221; C08G 2261/334; C08L 81/06; G01N 27/40
See application file for complete search history.

(56) References Cited

U.S. PATENT DOCUMENTS

| | | | |
|---|---|---|---|
| 5,182,356 A * | 1/1993 | Connell | C08G 73/08 528/214 |
| 5,698,663 A | 12/1997 | Kinneberg | |
| 5,837,032 A | 11/1998 | Moll et al. | |
| 5,959,058 A | 9/1999 | Tonelli et al. | |
| 6,503,295 B1 | 1/2003 | Koros et al. | |
| 6,911,512 B2 | 6/2005 | Jing et al. | |
| 7,208,243 B2 | 4/2007 | Li et al. | |
| 7,691,515 B2 | 4/2010 | Li et al. | |
| 7,745,512 B2 | 6/2010 | Xia et al. | |
| 7,872,071 B2 | 1/2011 | Berthold et al. | |
| 7,989,579 B2 | 8/2011 | Ponce et al. | |
| 8,026,337 B2 | 9/2011 | Ponce et al. | |
| 8,309,228 B2 | 11/2012 | Dierdorf et al. | |
| 8,415,447 B2 | 4/2013 | Rydin et al. | |
| 8,679,632 B2 | 3/2014 | Smith | |
| 8,816,003 B2 | 8/2014 | Liu et al. | |
| 8,911,840 B2 | 12/2014 | Leiden et al. | |
| 9,233,344 B1 | 1/2016 | Liu et al. | |
| 9,403,120 B2 | 8/2016 | He et al. | |
| 9,718,031 B2 | 8/2017 | Ma et al. | |
| 9,751,053 B2 | 9/2017 | Liu et al. | |
| 10,053,598 B2 | 8/2018 | Yalcin et al. | |
| 2006/0154129 A1 | 7/2006 | Li et al. | |
| 2007/0155953 A1 | 7/2007 | Li et al. | |
| 2008/0182964 A1 | 7/2008 | Ponce et al. | |
| 2008/0193652 A1 | 8/2008 | De Figueiredo Gomes et al. | |
| 2008/0317946 A1 | 12/2008 | Chen | |
| 2009/0318620 A1 | 12/2009 | Liu et al. | |
| 2010/0043906 A1 | 2/2010 | Jackson et al. | |
| 2010/0168376 A1 | 7/2010 | Ponce et al. | |
| 2010/0270234 A1 | 10/2010 | Liu et al. | |
| 2010/0326273 A1 | 12/2010 | Liu et al. | |
| 2011/0071268 A1 | 3/2011 | Hays et al. | |
| 2012/0322911 A1 | 12/2012 | Liu et al. | |
| 2012/0323059 A1 | 12/2012 | Liu et al. | |
| 2013/0206694 A1* | 8/2013 | Nunes | B01D 67/0079 210/500.28 |
| 2015/0368496 A1 | 12/2015 | Hawig | |
| 2016/0089640 A1 | 3/2016 | Liu et al. | |
| 2016/0303521 A1 | 10/2016 | Chakraborty et al. | |
| 2016/0329534 A1 | 11/2016 | Flynn et al. | |
| 2017/0157555 A1 | 6/2017 | Karode et al. | |
| 2017/0157556 A1 | 6/2017 | Karode et al. | |
| 2017/0157557 A1 | 6/2017 | Ding et al. | |
| 2017/0327677 A1 | 11/2017 | Neuteboom et al. | |
| 2020/0070107 A1 | 3/2020 | Maab et al. | |

FOREIGN PATENT DOCUMENTS

| | | |
|---|---|---|
| CA | 2619814 A1 | 7/2008 |
| CA | 2620696 A1 | 8/2008 |
| CN | 101235147 A | 8/2008 |
| CN | 101244416 A | 8/2008 |
| CN | 102558555 A | 7/2012 |
| DE | 102007005666 A1 | 8/2008 |
| DE | 102007007879 A1 | 8/2008 |
| DE | 102008024344 A1 | 12/2008 |
| DK | 1953186 T3 | 1/2010 |
| EP | 1953186 A1 | 8/2008 |
| EP | 1978052 A1 | 10/2008 |
| EP | 2236542 A1 | 10/2010 |
| EP | 2626127 A2 | 8/2013 |
| EP | 2667441 A1 | 11/2013 |
| GR | 1006508 B | 9/2009 |
| JP | 2008522014 A | 6/2008 |
| JP | 2008189921 A | 8/2008 |
| JP | 2008194687 A | 8/2008 |
| JP | 20098004367 A | 1/2009 |
| JP | 2011168779 A | 9/2011 |
| KR | 20060023450 A | 3/2006 |
| KR | 20080071935 A | 8/2008 |
| WO | 9404253 A2 | 3/1994 |
| WO | 2006060556 A2 | 6/2006 |

OTHER PUBLICATIONS

Chisca et al., "Crosslinked polytriazole membranes for organophilic filtration", Journal of Membrane Science, vol. 528, pp. 264-272, 2017.

Gomes et al., "Synthesis and characterization of flexible polyoxadiazole films through cyclodehydration of polyhydrazides", Polymer, vol. 44, pp. 3633-3639, 2003.

Hensema et al., "Polyoxadiazoles and polytriazoles as new heat and solvent resistant membrane materials", Bull. Soc. Chim. Belg, vol. 100, No. 2, pp. 129-136, 1991.

Hensema et al., "Gas separation properties of new polyoxadiazole and polytriazole membranes", Gas Separation & Purification, vol. 8, No. 3, pp. 149-160, 1994.

Hensema et al., "Polymeric Gas Separation Membranes", Advanced Materials, vol. 6, No. 4, 1994.

Maab et al., "Synthesis and fabrication of nanostructured hydrophobic polyazole membranes for low-energy water recovery", Journal of Membrane Science, vol. 423-424, pp. 11-19, 2012.

Maab et al., "Porous polyoxadiazole membrantes for harsh environment", Journal of Membrane Science, vol. 445, pp. 127-134, 2013.

Maab et al., "Polyazole Hollow Fiber Membranes for Direct Contact Membrane Distillation", Industrial & Engineering Chemistry Research, vol. 52, pp. 10425-10429, 2013.

Matar et al., "Temporal Changes in Extracellular Polymeric Substances on Hydrophobic and Hydrophilic Membrane Surfaces in a Submerged Membrane Bioreactor", Water Research, vol. 95, pp. 27-38, 2016.

Mirza et al., "Surface Coatings on Steel Pipes Used in Oil and Gas Industries—A Review", American Chemical Science Journal, 13(1): 1-23, Article No. ACSJ.22790, 2016.

Perepelkin et al., "Highly Heat-Resistant Polyoxadiazole Fibres and Arselon Filament: Principles of Manufacture, Properties, and Use. An Analytical Review", Chemistry and Technology of Chemical Fibres, Fibre Chemistry, vol. 40, No. 5, pp. 406-414, 2008.

Robeson, "Correlation of separation factor versus permeability for polymeric membranes", Journal of Membrane Science, vol. 62, pp. 165-185, 1991.

Robeson, "The upper bound revisited", Journal of Membrane Science, vol. 320, pp. 390-400, 2008.

Schulz et al., "Aromatic Poly(1,3,4-oxadiazole)s AS Advanced Materials", Advanced Materials, vol. 9, No. 8, 1997.

Gebben et al., "Gas Separation Properites of Thermally Stable and Chemically Resistant Polytriazole Membrane", Journal of Membrane Science, Elsevier BV, NL, vol. 46, No. 1, Sep. 1, 1989.

International Search Report and Written Opinion dated May 24, 2019 pertaining to International Application No. PCT/US2018/060650, 17 pgs.

Notice of Allowance and Fee(s) Due dated Oct. 15, 2020 pertaining to U.S. Appl. No. 16/114,676, filed Aug. 28, 2018, 27 pgs.

* cited by examiner

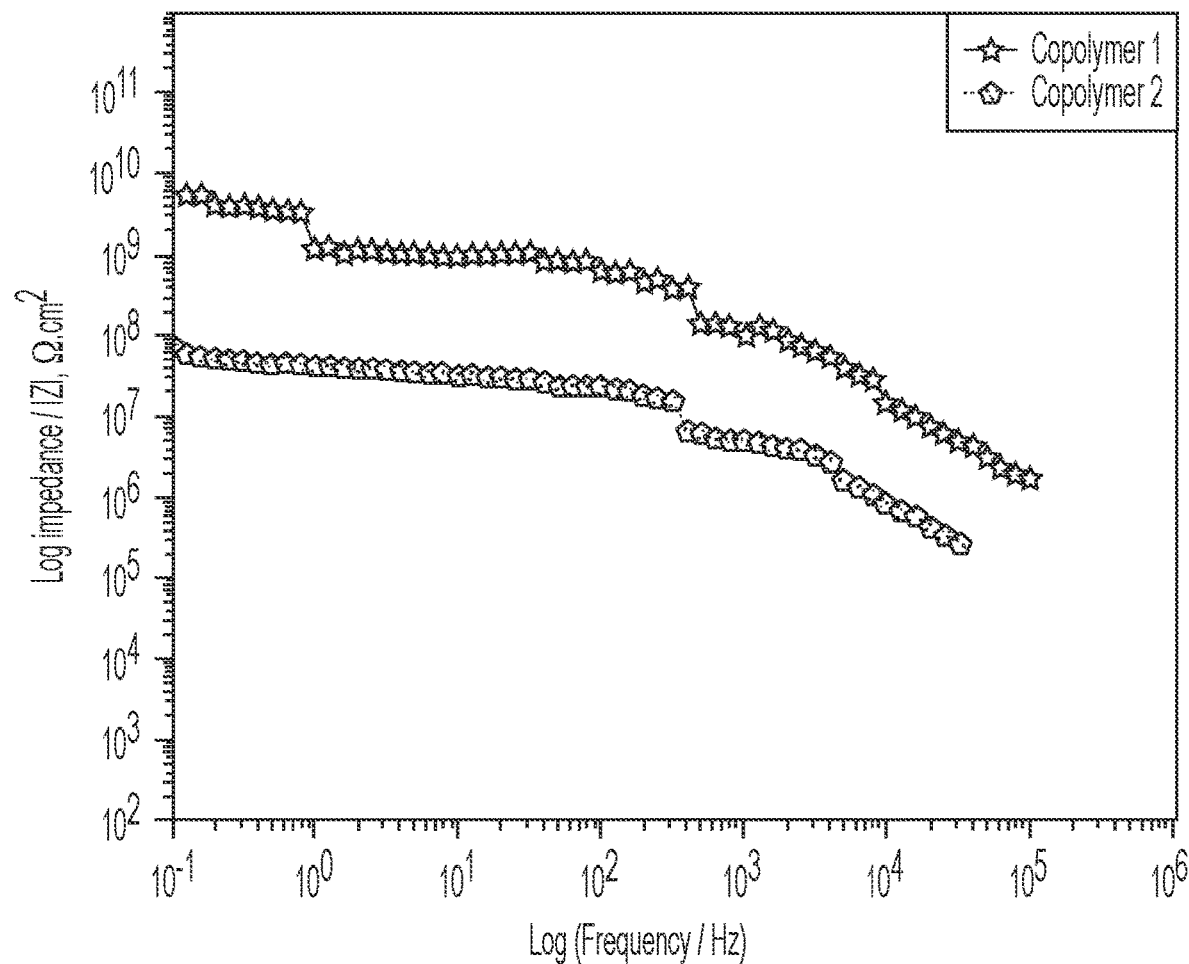

POLYTRIAZOLE COPOLYMER COMPOSITIONS

CROSS-REFERENCE TO RELATED APPLICATION

This application is a continuation of U.S. patent application Ser. No. 16/931,565, filed Jul. 17, 2020, the entire disclosure of which is hereby incorporated herein by reference.

BACKGROUND

Field

The present specification generally relates to polymer compositions, and more particularly to polytriazole copolymer compositions.

Technical Background

Industries that utilize polymer materials in rugged conditions highly value mechanical properties such as thermal and chemical stability, low dielectric constant, flame resistance, hydrophobicity, and moisture resistance. Polymers exhibiting favorable properties may be incorporated into a number of diverse applications, from use as structural materials, as coatings for metal substrates, and as membranes or membrane coatings for water purification or gas separation. Especially desirable are polymers that exhibit beneficial structural properties or anticorrosive properties without a need for additives such as binders, additives, and fillers, any of which may affect performance or result in instability under certain conditions. Accordingly, there are ongoing needs for polymers with properties suitable for applications such as coating of metal substrates, water purification, gas separation, and other applications for which any of thermal and chemical stability, low dielectric constant, flame resistance, hydrophobicity, or moisture resistance are desired. Such polymers should exhibit increased performance while also being substantially free from binders, additives, and fillers.

SUMMARY

According to some embodiments of this disclosure, a polytriazole copolymer has a structure according to formula (I):

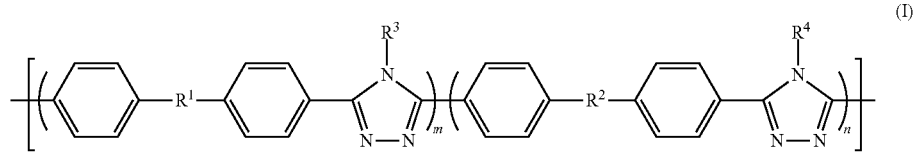

In formula (I), $R^1$ and $R^2$ may be independently selected from —$C(CF_3)_2$— and —O— and $R^3$ and $R^4$ may be independently selected from substituted phenyls according to formula (a) and substituted benzyls according to formula (b) provided that, when $R^1$ and $R^2$ are identical, $R^3$ and $R^4$ are not identical:

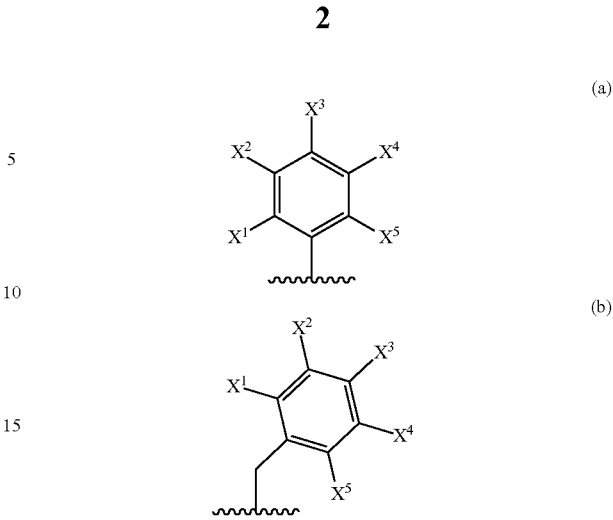

Further, in formula (I), $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ on each $R^3$ and each $R^4$ is not hydrogen. Subscripts m and n represent monomer mole fractions in the polytriazole copolymer. In embodiments, $0<m<1$, $0<n<1$, and the sum (m+n) equals 1. In some embodiments, the polytriazole copolymer may have degrees of polymerization from 25 to 250.

Additional features and advantages of the embodiments of this disclosure will be set forth in the detailed description that follows, and in part will be readily apparent to those skilled in the art from that description or recognized by practicing the embodiments of this disclosure, including the detailed description that follows and the claims.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawing illustrates the various embodiments described in the present disclosure, and together with the description serve to explain the principles and operations of the claimed subject matter.

BRIEF DESCRIPTION OF THE DRAWING

The FIGURE is a graph of impedance of various polytriazole copolymer films, according to embodiments, over a frequency range of 0.1 Hz to $10^5$ Hz.

DETAILED DESCRIPTION

Polymers are commonly applied in a variety of technological fields, often in harsh environments. Properties of polymers are, in general, environmentally dependent, and as a result, polymers in any application may have uneven performance when subjected to harsh environmental factors. Various polymers have received considerable attention as special coating materials for metal substrates, membrane materials for gas separation applications, and membrane materials for water purification applications. However, such polymers often require binders, additives, and fillers that may affect performance or that may result in instability under harsh conditions.

The polytriazole copolymers according to embodiments of this disclosure may be included in various applications in harsh environments, including but not limited to conditions typically associated with various production processes. For example, the polytriazole copolymers may be applied to metal substrates, which may be incorporated into a variety of industrial fields. In particular, the polytriazole polymers may be applied to metal substrates, such as metal pipelines and storage vessels, to improve the durability of the metal substrates under conditions typically associated with hydrocarbon production processes. Therefore, the polytriazole copolymers, as described according to the present application, exhibit increased thermal stability, corrosion resistance (for example, impedance), and surface hydrophobicity compared to other polymers, without requiring the inclusion of binders, additives, and fillers.

In general, polytriazole copolymers, as described in the present application, are capable of protecting metal substrates from corrosion because the polytriazole copolymers exhibit ideal characteristics, such as increased impedance at high frequencies. The impedance of a polytriazole copolymer applied to a metal substrate correlates to the rate at which the metal substrate would corrode in harsh conditions. For example, an impedance of a coating greater than $10^6$ ohms per square centimeter ($\Omega/cm^2$) at a frequency of 1,000 Hertz (Hz) may strongly indicate desirable corrosion resistance of the polytriazole copolymer, even under harsh conditions, such as those typically associated with hydrocarbon production processes. As a result, the polytriazole copolymers according to embodiments described in the present disclosure have corrosion resistance characteristics for use in various commercial applications in which corrosion resistance is desired. Based on their performance in coating applications, the polytriazole copolymers may also be used in other technological fields, such as water purification and gas separation applications.

According to embodiments of this disclosure, polytriazole copolymers may be suitable for coating metal substrates because of the corrosion resistance of the polytriazole copolymers even under harsh conditions, such as those associated with hydrocarbon production processes.

Accordingly, reference will now be made in detail to embodiments of polytriazole copolymers.

Polytriazole copolymers will now be described. It should be understood that in all representations of chemical structures in this disclosure, a wavy line drawn perpendicularly to a bond denotes a connection point of the chemical structure with another chemical structure or functional group and implies that the bond broken by the wavy line extends to another atom not shown in the representation.

In embodiments, the polytriazole copolymer may include a polytriazole copolymer according to general formula (I):

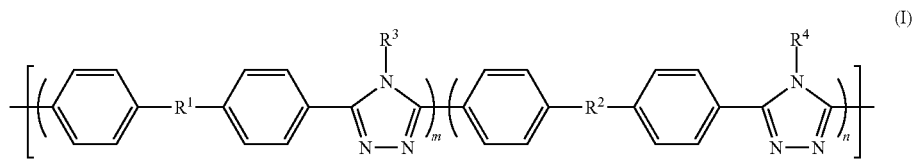

(I)

In formula (I), $R^1$ and $R^2$ may be independently selected from —C(CF$_3$)$_2$— and —O— and $R^3$ and $R^4$ may independently selected from substituted phenyls and substituted benzyls provided that, when $R^1$ and $R^2$ are identical, $R^3$ and $R^4$ are not identical.

The subscript m of formula (I) denotes the mole fraction of the fluorinated diphenylmethane polytriazole monomers (—C(CF$_3$)$_2$—) present as $R^1$ in the polytriazole copolymer of formula (I), where 0<m<1. In embodiments, the subscript m may be 0.1, 0.2, 0.3, 0.4, 0.5, 0.6, 0.7, 0.8, or 0.9. The subscript n of formula (I) denotes the mole fraction of the diphenyl ether polytriazole monomers (—O—) present as $R^2$ in the polytriazole copolymer of formula (I), where 0<n<1. In embodiments, the subscript n may be 0.1, 0.2, 0.3, 0.4, 0.5, 0.6, 0.7, 0.8, or 0.9. In one or more embodiments, subscript m may be from 0.4 to 0.6 and subscript n may be from 0.4 to 0.6. In embodiments, the mole fractions of subscripts m and n present in formula (I), m+n=1. Regardless of the mole fractions of subscripts m and n present in formula (I), the polytriazole copolymer may have a degree of polymerization from 25 to 250.

Groups $R^3$ and $R^4$ of the polytriazole copolymer may be independently selected from substituted phenyls according to formula (a) and substituted benzyls according to formula (b):

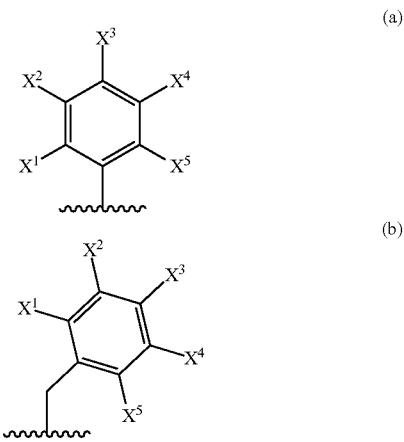

In formulas (a) and (b), $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ on each $R^3$ and each $R^4$ is not hydrogen.

As used throughout this disclosure, the terms "independently chosen from" and "independently selected from" mean that for multiple instances of a variable group in a particular chemical structure or moiety, the identity of each individual instance does not depend on the identity of any other individual instance, subject only to any exceptions or provisos that are explicitly stated.

In embodiments, in each $R^3$ and each $R^4$, $X^1$, $X^2$, $X^3$, $X^4$, and $X^5$ are independently selected from the group consisting of hydrogen, bromo, chloro, and fluoro, provided at least one of $X^1$, $X^2$, $X^3$, $X^4$, or $X^5$ on each $R^3$ and each $R^4$ is not hydrogen.

In one or more embodiments, in each $R^3$ and each $R^4$, exactly four of $X^1$, $X^2$, $X^3$, $X^4$, and $X^5$ are hydrogen, while the remaining one of $X^1$, $X^2$, $X^3$, $X^4$, and $X^5$ is bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy. Examples of embodiments in which exactly four of $X^1$, $X^2$, $X^3$, $X^4$, and $X^5$ are hydrogen, $R^3$ and $R^4$ may be independently selected from 3-(trifluoromethyl)phenyl, 4-bromophenyl, 4-hydroxyphenyl, 4-fluorophenyl, 4-tert-butylphenyl, 4-(dimethylamino)phenyl, 4-(triphenylmethyl)phenyl, 4-[tris(4-fluorophenyl)methyl]phenyl, 4-[tris(4-methylphenyl)methyl]phenyl, 4-[(4-hydroxyphenyl)diphenylmethyl]phenyl, 4-(triphenylmethyl)benzyl, 4-[tris(4-fluorophenyl)methyl]benzyl, 4-[tris(4-methylphenyl)methyl]benzyl, 4-[(4-hydroxyphenyl)diphenylmethyl]benzyl, 4-(trifluoromethyl)benzyl, 4-fluorobenzyl, 4-methylbenzyl, and 4-carboxybenzyl. In one or more embodiments, $R^3$ and $R^4$ may be independently selected from 4-bromophenyl, 4-fluorophenyl, 4-hydroxyphenyl, and 3-(trifluoromethyl)phenyl. In embodiments, $R^3$ and $R^4$ may be independently selected from 4-bromophenyl, 4-fluorophenyl, and 3-(trifluoromethyl)phenyl. In one or more embodiments, $R^3$ may be 4-bromophenyl and $R^4$ may be 4-fluorophenyl.

In embodiments, in each $R^3$ and each $R^4$, exactly three of $X^1$, $X^2$, $X^3$, $X^4$, and $X^5$ are hydrogen, while the remaining two of $X^1$, $X^2$, $X^3$, $X^4$, and $X^5$ are independently bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy. In the embodiments in which exactly three of $X^1$, $X^2$, $X^3$, $X^4$, and $X^5$ are hydrogen, $R^3$ and $R^4$ may be independently selected from 2,4-difluorophenyl, 2,5-difluorophenyl, 2-bromo-4-fluorophenyl, 2-chloro-4-(triphenylmethyl)phenyl, 3-chloro-5-fluorophenyl, 3-chloro-4-fluorophenyl, 4-fluoro-3-(trifluoromethyl)phenyl, 3-bromo-4-methylphenyl, and 3,5-(di-trifluoromethyl)benzyl. In one or more embodiments, $R^3$ and $R^4$ may both be 2,5-difluorophenyl.

In embodiments, in each $R^3$ and each $R^4$, exactly two of $X^1$, $X^2$, $X^3$, $X^4$, and $X^5$ may be hydrogen, while the remaining three of $X^1$, $X^2$, $X^3$, $X^4$, and $X^5$ are independently bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy. In example embodiments in which exactly two of $X^1$, $X^2$, $X^3$, $X^4$, and $X^5$ are hydrogen, $R^3$ and $R^4$ may be independently selected from 4-bromo-2,5-difluorophenyl, 4-bromo-2,6-difluorophenyl, 2,6-dibromo-4-fluorophenyl, 3,5-dibromo-4-methylphenyl, 2,4,6-trimethylphenyl, 2,4,6-trifluorophenyl, 2,4,6-trifluorobenzyl, 3,4,5-trifluorobenzyl, 2,3,4-trifluorobenzyl, and 2,4,6-trimethylbenzyl. In one or more embodiments, $R^3$ and $R^4$ may both be 4-bromo-2,5-difluorophenyl.

In one or more embodiments, in each $R^3$ and each $R^4$, exactly one of $X^1$, $X^2$, $X^3$, $X^4$, or $X^5$ is hydrogen, while the remaining four of $X^1$, $X^2$, $X^3$, $X^4$, and $X^5$ are independently bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy.

In some embodiments, in each $R^3$ and each $R^4$, none of $X^1$, $X^2$, $X^3$, $X^4$, and $X^5$ is hydrogen. In such embodiments, each of $X^1$, $X^2$, $X^3$, $X^4$, and $X^5$ is independently selected from the group consisting of bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy. In an example embodiment, $R^3$ and $R^4$ are both 2,3,4,5,6-pentafluorophenyl.

According to embodiments, the polytriazole copolymer of formula (I) may have a degree of polymerization from 25 to 250, such as from 25 to 225, from 25 to 200, from 25 to 175, from 25 to 150, from 50 to 250, from 50 to 225, from 50 to 200, from 50 to 175, from 50 to 150, from 75 to 250, from 75 to 225, from 75 to 200, from 75 to 175, from 75 to 150, or any other subset of the range from 25 to 250.

In embodiments, the polytriazole copolymer may have a structure according to formula (II):

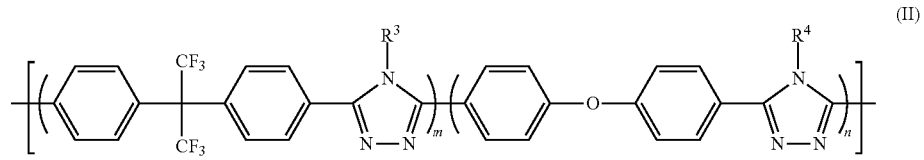

(II)

As should be apparent, formula (II) is a subset of formula (I), in which each $R^1$ of formula (I) is —C(CF$_3$)$_2$— and each $R^2$ of formula (I) is —O—. In formula (II), m and n are as defined in formula (I), and each $R^3$ and $R^4$ may be a substituted phenyl according to formula (a) or a substituted benzyl according to formula (b), as previously defined with respect to formula (I). Likewise, in each $R^3$ and $R^4$ of a polytriazole copolymer according to formula (II), each of $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ on each $R^3$ and each $R^4$ is not hydrogen. In embodiments, the polytriazole copolymer of formula (II) may have a degree of polymerization from 25 to 250 or any subset of the range from 25 to 250. In example embodiments in which the polytriazole copolymer has a structure according to formula (II), each $R^3$ may be 4-fluorophenyl and each $R^4$ may be 4-bromophenyl.

In embodiments, the polytriazole copolymer may have a structure according to formula (III):

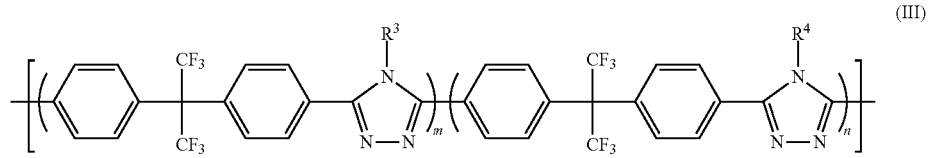

(III)

As should be apparent, formula (III) is a subset of formula (I), in which each $R^1$ of formula (I) is —C(CF$_3$)$_2$— and each $R^2$ of formula (I) is also —C(CF$_3$)$_2$—. In formula (III), m and n are as defined in formula (I), and each $R^3$ and $R^4$ may be a substituted phenyl according to formula (a) or a substituted benzyl according to formula (b), as previously defined with respect to formula (I). Likewise, in each $R^3$ and $R^4$ of a polytriazole copolymer according to formula (III), each of $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris (4-methylphenyl)methyl, (4-hydroxyphenyl)diphenylmethyl, and difluoromethoxy, provided at least one of $X^1$, $X^2$, $X^3$, $X^4$, or $X^5$ on each $R^3$ and each $R^4$ is not hydrogen. In embodiments, the polytriazole copolymer of formula (III) may have a degree of polymerization from 25 to 175 or any other range from 25 to 175. In example embodiments in which the polytriazole copolymer has a structure according to formula (III), $R^3$ may be 4-bromophenyl and each $R^4$ may be 4-fluorophenyl.

In embodiments, the polytriazole copolymer may have a structure according to formula (IV):

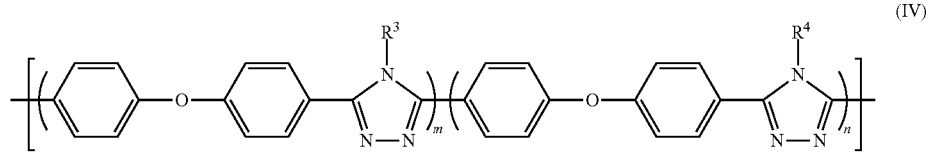

(IV)

As should be apparent, formula (IV) is a subset of formula (I), in which each $R^1$ of formula (I) is —O— and each $R^2$ of formula (I) is —O—. In formula (IV), m and n are as defined in formula (I), and each $R^3$ and $R^4$ may be a substituted phenyl according to formula (a) or a substituted benzyl according to formula (b), as previously defined with respect to formula (I). Likewise, in each $R^3$ and $R^4$ of a polytriazole copolymer according to formula (IV), each of $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ on each $R^3$ and each $R^4$ is not hydrogen. In embodiments, the polytriazole copolymer of formula (IV) may have a degree of polymerization from 75 to 250 or any other range from 75 to 250.

The polytriazole copolymers may be prepared by following any suitable synthetic strategy. In some instances, the polytriazole copolymers described in the present disclosure may be prepared by a polycondensation reaction. In an exemplary polycondensation route, hydrazine sulfate and polyphosphoric acid (PPA) are mixed with 4,4'-(hexafluoroisopropylidene)bis(benzoic acid), 4,4'-oxybis(benzoic acid), or combinations thereof, under an inert atmosphere such as N$_2$ gas. The mixture is vigorously stirred for 3 hours at 160 degrees Celsius (° C.) to form a viscous polymer. The resulting viscous polymer is then precipitated into 5 liters of 1 molar sodium hydroxide (NaOH) solution and washed in de-ionized water at 80° C. for 12 hours to form precipitated polyoxadiazole fibers. The precipitated polyoxadiazole fibers are collected by filtration and vacuum dried at 110° C. for 12 hours. The polyoxadiazole polymer is then dissolved in a solvent such as N-methyl-2-pyrrolidone and stirred under N$_2$ atmosphere as one or more substituted phenyl groups and additional PPA are added to the mixture. The reaction produces polytriazole copolymers with modifications such as substituted phenyl groups or substituted benzyl groups.

EXAMPLES

The following examples illustrate one or more additional features of the present disclosure described previously. It should be understood that these examples are not intended to limit the scope of the disclosure or the appended claims in any manner.

In the following examples, polytriazole copolymers were prepared and characterized with respect to physical and thermal properties indicative of the ability to impart corrosion resistance to metal substrates. Metal substrates were coated with a polytriazole copolymer prepared in a manner that will be described. The coated metal substrate was then subjected to various tests that provide insight relating to the anti-corrosive properties of the polytriazole copolymer. Specifically, a metal substrate was coated with a polytriazole copolymer and subjected to water absorption tests, electrochemical impedance spectroscopy (EIS), differential scanning calorimetry (DSC), and water contact angle measurement.

Example 1

Preparation of Polytriazole Copolymers 1 and 2

Polytriazole copolymers according to formulas (I)-(IV) as previously described are prepared according to the following general method.

The polytriazole copolymers are prepared by a polycondensation reaction between hydrazine sulfate and 4,4'-(hexafluoroisopropylidene)bis(benzoic acid) or 4,4'-oxybis(benzoic acid) along with polyphosphoric acid (PPA) under an inert environment of $N_2$ gas and vigorous stirring for 3 hours at 160° C. The resulting viscous polymer is then precipitated into 5 liters of 1-molar sodium hydroxide (NaOH) solution and washed in de-ionized water at 80° C. for 12 hours. The precipitated polyoxadiazole fibers are collected by filtration and vacuum dried at 110° C. for 12 hours. The polyoxadiazole polymer is then dissolved in N-methyl-2-pyrrolidone solvent and stirred under $N_2$ atmosphere as one or more substituted phenyl groups and PPA is added to the mixture. The reaction produces polytriazole copolymers. As the fluorinated diphenylmethane polytriazole copolymer is highly soluble in organic solvents, other suitable solvents may include chloroform, dichloromethane, trichloroethylene, N-methyl-2-pyrrolidone, dimethyl acetamide, dimethyl formamide, dimethyl sulfoxide, or combinations thereof.

Copolymers 1 and 2 were prepared according to the foregoing general synthesis and were tested for their physical and chemical properties. Copolymers 1 and 2 had the following structures, in which subscripts m and n represent monomer mole fractions within the copolymer:

Various thermal and physical properties of Copolymers 1 and 2 were determined. The copolymers had average molecular weights ($M_w$) of 60 kilograms per mol (kg/mol) and 105 kg/mol, as determined by size exclusion chromatography, respectively. In Copolymer 1, the subscript m was 0.60 and the subscript n was 0.40. In Copolymer 2, the subscript m was 0.52 and the subscript n was 0.48.

Polydispersity indices (PDI) are calculations of the distribution of molecular weights among many copolymer molecules in a given copolymer sample. The PDI is directly calculated by the Gel Permeation Chromatography (GPC) techniques used for molecular weight determination of copolymer samples. The PDI for Copolymers 1 and 2 were obtained from GPC during the molecular weight determination of each of the copolymers. As shown in Table 1, PDI for Copolymers 1 and 2 were both 2.6. In general, the PDI data indicates relative uniformity of molecular weight distribution in each of Copolymers 1 and 2.

Copolymers 1 and 2 had degrees of polymerization of 61 and 146, respectively. The degree of polymerization was calculated by dividing the molecular weight ($M_w$) of the entire copolymer by the $M_w$ of the individual polymer unit. The degrees of polymerization for Copolymers 1 and 2 were obtained by dividing the molecular weight of a copolymer by the molecular weight of the monomeric unit of the same copolymer. As shown in Table 1, Copolymers 1 and 2 each had a degree of polymerization of at least 61. The degree of polymerization data indicates mechanical stability, thermal stability, and chemical stability of each of the copolymers.

The thermal stabilities of Copolymers 1 and 2 were further analyzed by thermogravimetric analysis (TGA). Both of the copolymers exhibited a 5 weight percent (wt %) loss at temperatures of 481° C. and 490° C., respectively. The char (percent residue) remaining at 650° C. for Copolymers 1 and 2 were 50% and 68%, respectively.

Table 1 summarizes the thermal and physical properties for the prepared polytriazole copolymers.

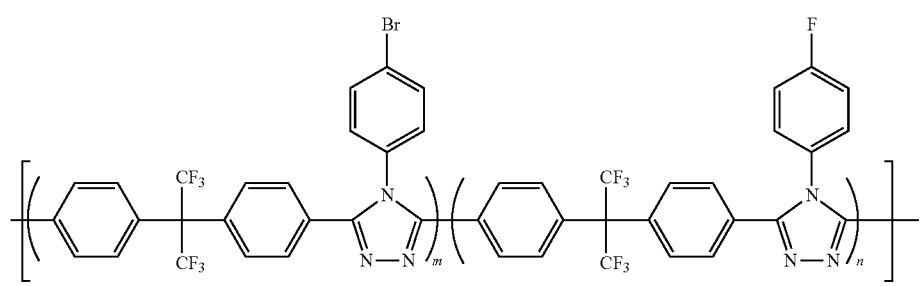

(Copolymer 1)

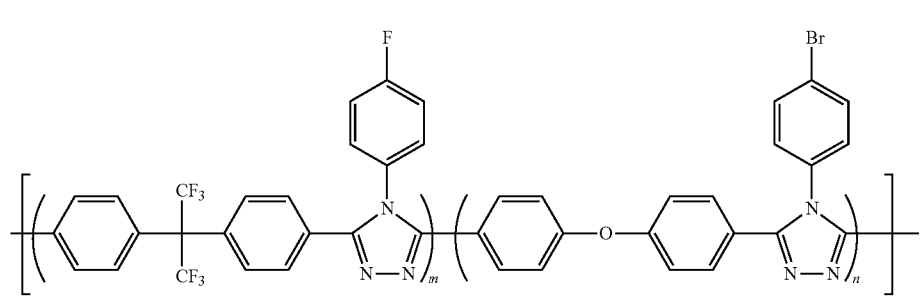

(Copolymer 2)

TABLE 1

Thermal and Physical Properties of Copolymers 1 and 2

| Copolymer Identification | Molecular Weight ($M_w$) (kg/mol) | Polydispersity ($M_w/M_n$) | Degree of Polymerization (Units) | Degradation Temperature at 5% weight loss of $N_2$ (° C.) | Char Residue Remaining at 650° C. (%) |
|---|---|---|---|---|---|
| Copolymer 1 | 60 | 2.6 | 61 | 481 | 50 |
| Copolymer 2 | 105 | 2.6 | 146 | 490 | 68 |

Example 2

Preparation of the Polytriazole Copolymer Films for Water Absorption Tests

A homogenous solution was prepared by dissolving 2.0 grams (g) of a polytriazole copolymer in 100 g of chloroform (2 wt % solution) by magnetic stirring at about 25° C. for about 24 hours. The solution was poured into petri dishes. Then, the solvent was evaporated from the solution at 25° C. Once the solvent evaporated, the solution was dried under vacuum at 50° C. for 24 hours to produce various polytriazole copolymer films. The resulting films were dense, symmetric, flat sheets having thicknesses from 40 micrometers (m) to 50 m. No mass loss due to residual solvent was observed during TGA analysis of the films.

Each of the polytriazole copolymer films was dried at 100° C. for about 12 hours. The polytriazole copolymer films were then submerged in 25° C. distilled water for about 72 hours. The polytriazole copolymer films were removed from the water and dried with tissue paper. Then, the weight of the hydrated polytriazole copolymer films were measured. Water absorption by the polytriazole copolymer films was calculated based on the weight gain of the copolymer film in parts per million (ppm) water based on the total weight of the hydrated film, according to Equation 1:

$$\text{Water Absorption (ppm)} = \frac{W2 - W1}{W2} * 10^6 \quad \text{Equation 1}$$

In Equation 1, W1 is the weight of the dried polytriazole copolymer film and W2 is the weight of the hydrated polytriazole copolymer films. Table 2 summarizes the water absorption amounts for the prepared polytriazole copolymers.

TABLE 2

Water Absorption Amounts of Copolymers 1 and 2

| Copolymer Identification | Water Absorption Amount (ppm) |
|---|---|
| Copolymer 1 | 3 |
| Copolymer 2 | 25 |

As shown in Table 2, polytriazole copolymer films 1 and 2 absorbed only a negligible amount of water under the test conditions. The negligible water absorption signifies that each of the polytriazole copolymer films have good ability to repel water in various applications. Without being bound by theory, it is believed that the presence of a triazole ring in each polymer unit provides the polytriazole copolymer films with high hydrolytic stability. In addition, the presence of bromine and fluorine atoms in Copolymers 1 and 2 further enhances the hydrophobic properties of the polytriazole copolymer films. These water absorption tests confirm the high hydrophobicity of the polytriazole copolymer films, consistent with an ability to repel water.

Example 3

Preparation of the Polytriazole Copolymer Films for Water Absorption Tests

Homogenous solutions of Copolymers 1 and 2 were prepared according to Example 2. Then, each of two carbon steel coupons (C1018) with dimensions of 7.3 centimeters (cm) by 2.2 cm were coated with a respective one of Copolymers 1 and 2 by solution casting or manual spraying techniques. After applying the polytriazole copolymer film, the carbon steel coupons were dried at 25° C. for about 12 hours followed by heated drying from 50° C. to 100° C. for 24 hours. The polytriazole copolymer films had final thicknesses from 100 m to 200 m.

Each of the carbon steel coupons was subjected to electron ionization spectrometry (EIS) measurement using a Parstat 4000 Potentiostat Galvanostat from Ametek® Scientific Instruments (Berwyn, Pennsylvania, USA). The EIS measurements were taken at open-circuit potential at a frequency from 0.01 Hz to $10^5$ Hz with an AC sine signal amplitude of 10 millivolts (mV). The measurements were conducted after the polytriazole copolymer coated substrates were exposed to a 3.5 wt % sodium chloride (NaCl) solution at room temperature for 7 days to simulate harsh conditions associated with hydrocarbon production processes. The FIGURE shows EIS results for the carbon steel coupons coated with Copolymers 1 and 2.

Referring to the FIGURE, each of the carbon steel coupons coated with Copolymers 1 and 2 showed varied resistances to corrosion under the applied test conditions. The impedance values for polytriazole Copolymers 1 and 2 at a frequency of 1,000 Hz were all greater than $10^6$ $\Omega/cm^2$. These impedance values are consistent with an ability of polytriazole Copolymers 1 and 2 to provide corrosion resistance to metal substrates. Such high resistive properties of the polytriazole copolymer according to the present disclosure may be attributed to the chemical structures of Copolymers 1 and 2.

Example 4

Thermal Stability Properties of the Polytriazole Copolymer Films

Dried polytriazole copolymer films of each of Copolymers 1 and 2 were prepared as described in Example 2. Each of the polytriazole copolymer films was subjected to differential scanning calorimetry (DSC) tests to determine the glass transition temperatures (Tg) of each of the polytriazole copolymer films. The DSC tests were conducted according to ASTM E1356, the Standard Test Method for Assignment of the Glass Transition Temperatures by DSC. Table 3 summarizes the Tg of each of the polytriazole copolymer films.

TABLE 3

Glass Transition Temperatures (Tg) of Copolymers 1 and 2

| Copolymer Identification | Tg (° C.) |
|---|---|
| Copolymer 1 | 191 |
| Copolymer 2 | 181 |

As shown in Table 3, each polytriazole copolymer film had a Tg of at least 181° C. The Tg of at least 181° C. evidences a thermal stability of the polytriazole copolymer films consistent when incorporated in various industrial applications. In addition, the Tg results are consistent with high stiffness of Copolymers 1 and 2 at high temperatures typical in, for example, petroleum processing environments. The high stiffness correlates with a relatively low percent elongation and suitable energy dissipation of the materials under stress.

Example 5

Contact Angle Measurements of the Polytriazole Copolymer Films

Dried polytriazole copolymer films of Copolymers 1 and 2 were prepared as described in Example 2. To confirm the water absorption tests, each of the polytriazole copolymer films was additionally subjected to water contact-angle measurements. Table 4 summarizes the contact angle measurements of each of the polytriazole copolymer films.

TABLE 4

Contact-Angle Measurements of Copolymers 1 and 2

| Copolymer Identification | Contact Angle |
|---|---|
| Copolymer 1 | 108° |
| Copolymer 2 | 104° |

As shown in Table 4, water droplets placed on surfaces of the Copolymers 1 and 2 had contact angles of 104° and 108°, respectively. These contact angle measurements confirmed that each of the polytriazole copolymer films had excellent hydrophobicity, consistent with a need to hinder diffusion of water and other corrosive substances from contacting the underlying substrate. As a result, the polytriazole copolymers of the present disclosure are expected to exhibit hydrophobicity when applied to a substrate.

The present disclosure is directed to at least one of the following aspects.

In a first aspect of the present disclosure, a polytriazole copolymer may have a structure according to formula (I), $R^1$ and $R^2$ are independently selected from —C(CF$_3$)$_2$— and —O— and $R^3$ and $R^4$ are independently selected from substituted phenyls according to formula (a) and substituted benzyls according to formula (b), provided that, when $R^1$ and $R^2$ are identical, $R^3$ and $R^4$ are not identical. In this aspect, $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris (4-methylphenyl)methyl, (4-hydroxyphenyl)diphenylmethyl, and difluoromethoxy, provided at least one of $X^1$, $X^2$, $X^3$, $X^4$, or $X^5$ on each $R^3$ and each $R^4$ is not hydrogen; m and n represent monomer mole fractions in the polytriazole copolymer; 0<m<1; 0<n<1; m+n=1; and the polytriazole copolymer has a degree of polymerization from 25 to 250.

A second aspect of the present disclosure may include the first aspect, wherein in each $R^3$ and each $R^4$, $X^1$, $X^2$, $X^3$, $X^4$, and $X^5$ may be independently selected from the group consisting of hydrogen, bromo, chloro, and fluoro, provided at least one of $X^1$, $X^2$, $X^3$, $X^4$, or $X^5$ on each $R^3$ and each $R^4$ is not hydrogen.

A third aspect of the present disclosure may include the first or second aspects, wherein in each $R^3$ and each $R^4$, exactly four of $X^1$, $X^2$, $X^3$, $X^4$, and $X^5$ are hydrogen.

A fourth aspect of the present disclosure may include the third aspect, wherein $R^3$ and $R^4$ may be independently selected from the group consisting of: 3-(trifluoromethyl) phenyl, 4-bromophenyl, 4-hydroxyphenyl, 4-fluorophenyl, 4-tert-butylphenyl, 4-(dimethylamino)phenyl, 4-(triphenylmethyl)phenyl, 4-[tris(4-fluorophenyl)methyl]phenyl, 4-[tris(4-methylphenyl)methyl]phenyl, 4-[(4-hydroxyphenyl)diphenylmethyl]phenyl, 4-(triphenylmethyl)benzyl, 4-[tris(4-fluorophenyl)methyl]benzyl, 4-[tris(4-methylphenyl)methyl]benzyl, 4-[(4-hydroxyphenyl)diphenylmethyl] benzyl, 4-(trifluoromethyl)benzyl, 4-fluorobenzyl, 4-methylbenzyl, and 4-carboxybenzyl.

A fifth aspect of the present disclosure may include the third aspect, wherein $R^3$ and $R^4$ may be independently selected from the group consisting of: 3-(trifluoromethyl) phenyl, 4-bromophenyl, 4-hydroxyphenyl, and 4-fluorophenyl.

A sixth aspect of the present disclosure may include the third aspect, wherein $R^3$ and $R^4$ may be independently selected from the group consisting of: 3-(trifluoromethyl) phenyl, 4-bromophenyl, and 4-fluorophenyl.

A seventh aspect of the present disclosure may include the first or second aspects, wherein in each $R^3$ and each $R^4$, exactly three of $X^1$, $X^2$, $X^3$, $X^4$, and $X^5$ are hydrogen.

An eighth aspect of the present disclosure may include the seventh aspect, wherein $R^3$ and $R^4$ may be independently selected from the group consisting of: 2,4-difluorophenyl, 2,5-difluorophenyl, 2-bromo-4-fluorophenyl, 2-chloro-4-(triphenylmethyl)phenyl, 3-chloro-5-fluorophenyl, 3-chloro-4-fluorophenyl, 4-fluoro-3-(trifluoromethyl)phenyl, 3-bromo-4-methylphenyl, and 3,5-(di-trifluoromethyl) benzyl.

A ninth aspect of the present disclosure may include the seventh aspect, wherein $R^3$ and $R^4$ may be 2,5-difluorophenyl.

A tenth aspect of the present disclosure may include the first or second aspects, wherein in each $R^3$ and each $R^4$, exactly two of $X^1$, $X^2$, $X^3$, $X^4$, and $X^5$ are hydrogen.

An eleventh aspect of the present disclosure may include the tenth aspect, wherein $R^3$ and $R^4$ may be independently selected from the group consisting of: 4-bromo-2,5-difluorophenyl, 4-bromo-2,6-difluorophenyl, 2,6-dibromo-4-fluorophenyl, 3,5-dibromo-4-methylphenyl, 2,4,6-trimethylphenyl, 2,4,6-trifluorobenzyl, 3,4,5-trifluorobenzyl, 2,3,4-trifluorobenzyl, and 2,4,6-trimethylbenzyl.

A twelfth aspect of the present disclosure may include the tenth aspect, wherein $R^3$ and $R^4$ may be 4-bromo-2,5-difluorophenyl.

A thirteenth aspect of the present disclosure may include the first or second aspects, wherein in each $R^3$ and each $R^4$, exactly one of $X^1$, $X^2$, $X^3$, $X^4$, or $X^5$ is hydrogen.

A fourteenth aspect of the present disclosure may include the first or second aspects, wherein in each $R^3$ and each $R^4$, none of $X^1$, $X^2$, $X^3$, $X^4$, or $X^5$ are hydrogen.

A fifteenth aspect of the present disclosure may include the fourteenth aspect wherein $R^3$ and $R^4$ may be 2,3,4,5,6-pentafluorophenyl.

A sixteenth aspect of the present disclosure may include the first or second aspects, wherein $R^3$ is 4-bromophenyl and $R^4$ is 4-fluorophenyl.

A seventeenth aspect of the present disclosure may include any of the first through sixteenth aspects, wherein the polytriazole copolymer has a structure according to formula (II), where m, n, $R^3$, and $R^4$ are as defined in formula (I) and the polytriazole copolymer has a degree of polymerization from 50 to 200.

An eighteenth aspect of the present disclosure may include any of the first through sixteenth aspects, wherein the polytriazole copolymer has a structure according to formula (III), where m, n, $R^3$, and $R^4$ are as defined in formula (I) and the polytriazole copolymer has a degree of polymerization from 25 to 175.

An nineteenth aspect of the present disclosure may include any of the first through sixteenth aspects, wherein the polytriazole copolymer has a structure according to formula (IV), where m, n, $R^3$, and $R^4$ are as defined in formula (I) and the polytriazole copolymer has a degree of polymerization from 75 to 250.

It should be apparent to those skilled in the art that various modifications and variations can be made to the embodiments described herein without departing from the spirit and scope of the claimed subject matter. Thus, it is intended that the specification cover the modifications and variations of the various embodiments described herein provided such modifications and variations come within the scope of the appended claims and their equivalents.

What is claimed is:

1. A polytriazole copolymer having a structure according to formula (I):

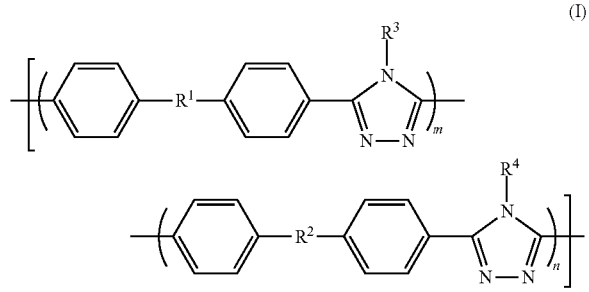

(I)

where:
$R^1$ and $R^2$ are independently selected from —C(CF$_3$)$_2$— and —O—;
$R^3$ and $R^4$ are independently selected from substituted phenyls according to formula (a) and substituted benzyls according to formula (b):

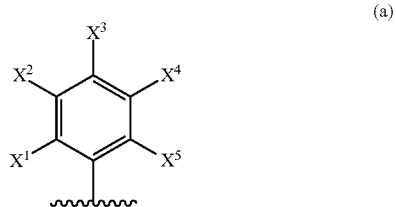

(a)

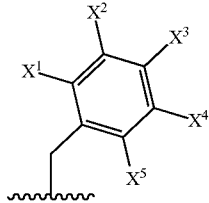

(b)

where:
$X^1$, $X^2$, $X^3$, $X^4$, and $X^5$ are independently selected from hydrogen, bromo, fluoro, chloro, iodo, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ on each $R^3$ and each $R^4$ is not hydrogen;
m and n represent monomer mole fractions in the polytriazole copolymer;
0<m<1;
0<n<1;
m+n=1,
provided that when $R^1$ and $R^2$ are identical, $R^3$ and $R^4$ are not identical,
the polytriazole copolymer having a degree of polymerization from 25 to 250.

2. The polytriazole copolymer of claim 1, wherein in each $R^3$ and each $R^4$, $X^1$, $X^2$, $X^3$, $X^4$, and $X^5$ are independently selected from the group consisting of hydrogen, bromo, chloro, and fluoro, provided at least one of $X^1$, $X^2$, $X^3$, $X^4$, or $X^5$ on each $R^3$ and each $R^4$ is not hydrogen.

3. The polytriazole copolymer of claim 1, wherein in each $R^3$ and each $R^4$, exactly four of $X^1$, $X^2$, $X^3$, $X^4$, and $X^5$ are hydrogen.

4. The polytriazole copolymer of claim 3, wherein $R^3$ and $R^4$ are independently selected from the group consisting of:
3-(trifluoromethyl)phenyl,
4-bromophenyl,
4-fluorophenyl,
4-tert-butylphenyl,
4-(dimethylamino)phenyl,
4-(triphenylmethyl)phenyl,
4-[tris(4-fluorophenyl)methyl]phenyl,
4-[tris(4-methylphenyl)methyl]phenyl,
4-[(4-hydroxyphenyl)diphenylmethyl]phenyl,
4-(triphenylmethyl)benzyl,
4-[tris(4-fluorophenyl)methyl]benzyl,
4-[tris(4-methylphenyl)methyl]benzyl,
4-[(4-hydroxyphenyl)diphenylmethyl]benzyl,
4-(trifluoromethyl)benzyl,
4-fluorobenzyl, and
4-carboxybenzyl.

5. The polytriazole copolymer of claim 3, wherein $R^3$ and $R^4$ are independently selected from the group consisting of:
3-(trifluoromethyl)phenyl
4-bromophenyl,
and
4-fluorophenyl.

6. The polytriazole copolymer of claim 3, wherein $R^3$ and $R^4$ are independently selected from the group consisting of:
3-(trifluoromethyl)phenyl
4-bromophenyl, and
4-fluorophenyl.

7. The polytriazole copolymer of claim 1, wherein in each $R^3$ and each $R^4$, exactly three of $X^1$, $X^2$, $X^3$, $X^4$, and $X^5$ are hydrogen.

8. The polytriazole copolymer of claim 7, wherein $R^3$ and $R^4$ are independently selected from the group consisting of:
2,4-difluorophenyl,
2,5-difluorophenyl,
2-bromo-4-fluorophenyl,
2-chloro-4-(triphenylmethyl)phenyl,
3-chloro-5-fluorophenyl,
3-chloro-4-fluorophenyl,
4-fluoro-3-(trifluoromethyl)phenyl,
3-bromo-4-methylphenyl, and
3,5-(di-trifluoromethyl)benzyl.

9. The polytriazole copolymer of claim 7, wherein $R^3$ and $R^4$ are 2,5-difluorophenyl.

10. The polytriazole copolymer of claim 1, wherein in each $R^3$ and each $R^4$, exactly two of $X^1$, $X^2$, $X^3$, $X^4$, and $X^5$ are hydrogen.

11. The polytriazole copolymer of claim 10, wherein $R^3$ and $R^4$ are independently selected from the group consisting of:
4-bromo-2,5-difluorophenyl,
4-bromo-2,6-difluorophenyl,
2,6-dibromo-4-fluorophenyl,
3,5-dibromo-4-methylphenyl,
2,4,6-trimethylphenyl,
2,4,6-trifluorobenzyl,
3,4,5-trifluorobenzyl,
2,3,4-trifluorobenzyl, and
2,4,6-trimethylbenzyl.

12. The polytriazole copolymer of claim 10, wherein $R^3$ and $R^4$ are 4-bromo-2,5-difluorophenyl.

13. The polytriazole copolymer of claim 1, wherein in each $R^3$ and each $R^4$, exactly one of $X^1$, $X^2$, $X^3$, $X^4$, or $X^5$ is hydrogen.

14. The polytriazole copolymer of claim 1, wherein in each $R^3$ and each $R^4$, none of $X^1$, $X^2$, $X^3$, $X^4$, and $X^5$ is hydrogen.

15. The polytriazole copolymer of claim 14, wherein $R^3$ and $R^4$ are 2,3,4,5,6-pentafluorophenyl.

16. The polytriazole copolymer of claim 1, wherein $R^3$ is 4-fluorophenyl and $R^4$ is 4-bromophenyl.

17. The polytriazole copolymer of claim 1, wherein the polytriazole copolymer has a structure according to formula (II):

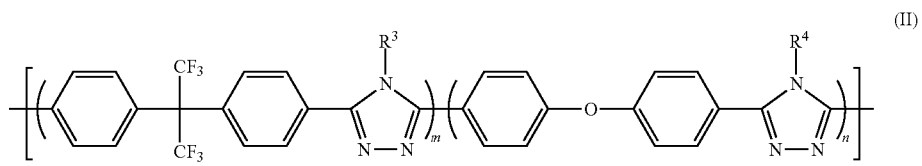

where:
m, n, $R^3$, and $R^4$ are as defined in formula (I); and
the polytriazole copolymer has a degree of polymerization from 50 to 200.

18. The polytriazole copolymer of claim 1, wherein the polytriazole copolymer has a structure according to formula (III):

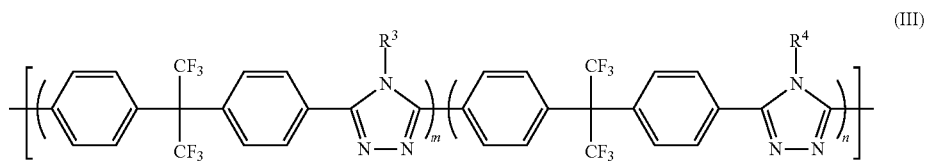

m, n, $R^3$, and $R^4$ are as defined in formula (I); and
the polytriazole copolymer has a degree of polymerization from 25 to 175.

19. The polytriazole copolymer of claim 1, wherein the polytriazole copolymer has a structure according to formula (IV):

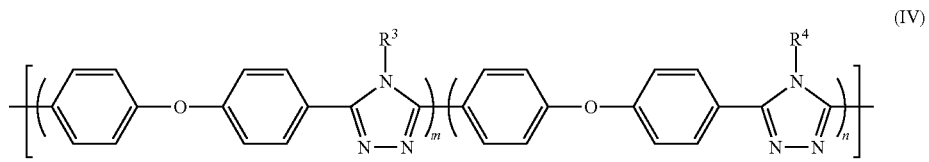

m, n, $R^3$, and $R^4$ are as defined in formula (I); and
the polytriazole copolymer has a degree of polymerization from 75 to 250.

* * * * *